UNITED STATES PATENT OFFICE.

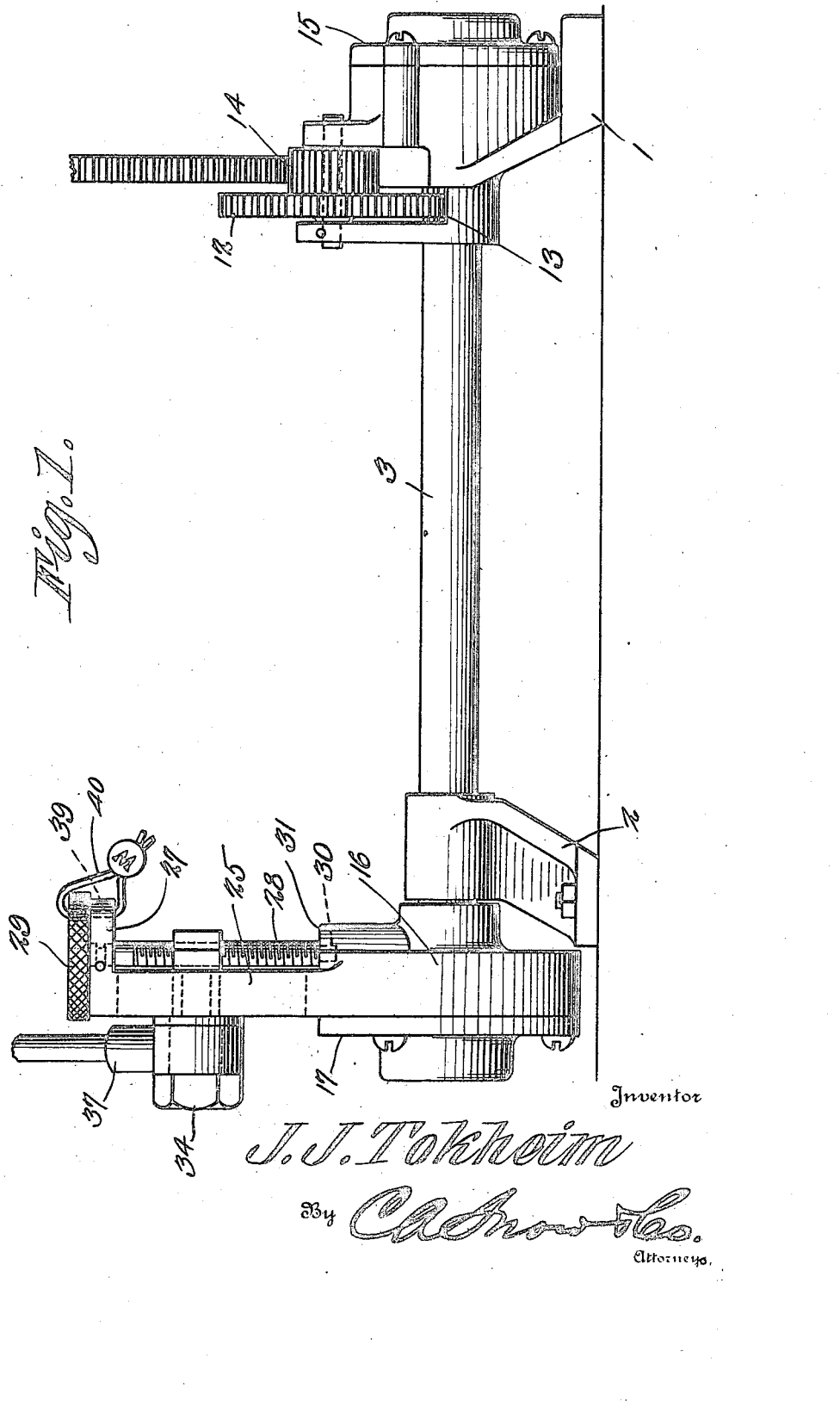

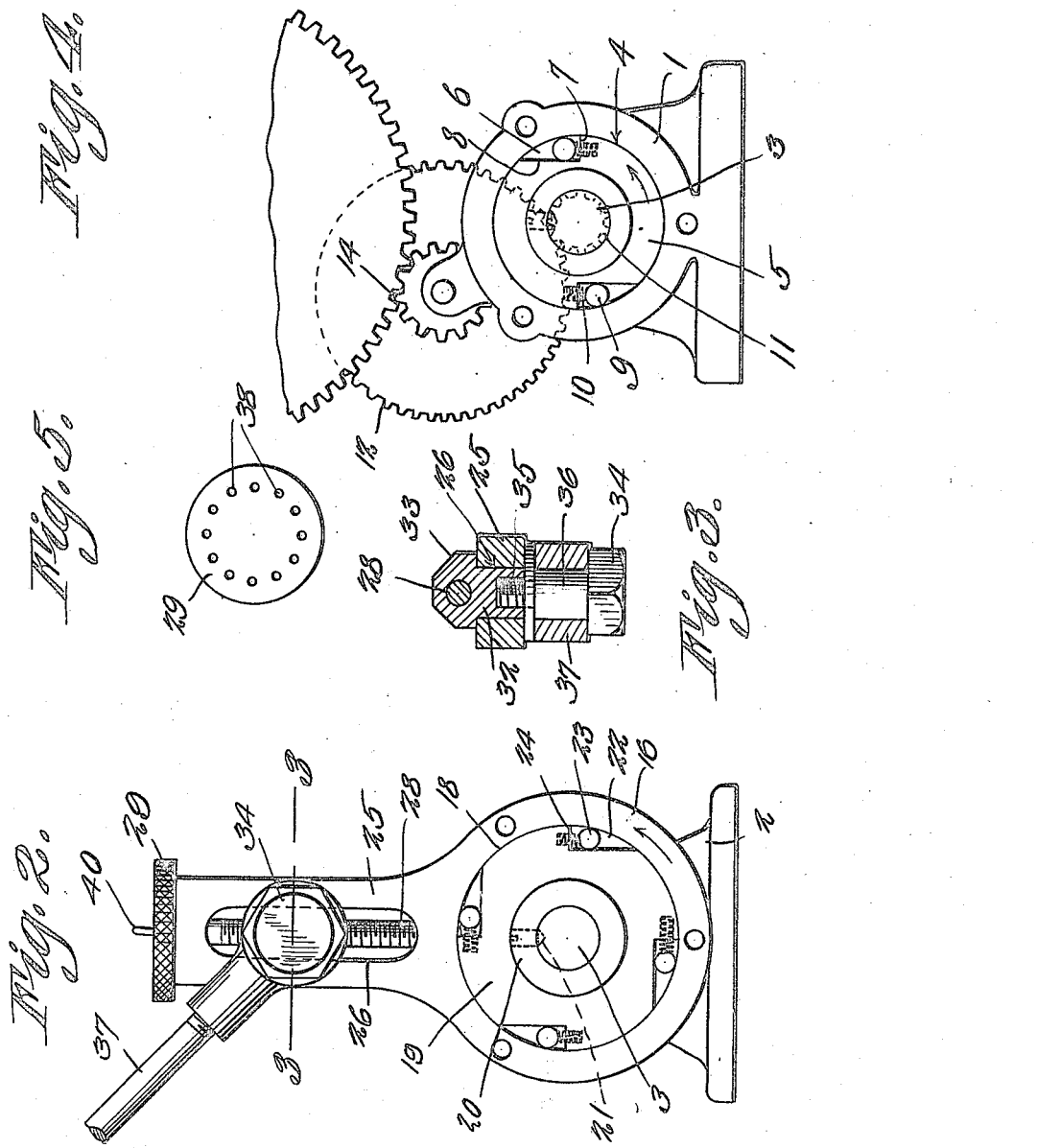

JOHN J. TOKHEIM, OF CEDAR RAPIDS, IOWA.

POWER-TRANSMITTING MECHANISM.

1,426,843.

Specification of Letters Patent. Patented Aug. 22, 1922.

Application filed March 21, 1922. Serial No. 545,424.

*To all whom it may concern:*

Be it known that I, JOHN J. TOKHEIM, a citizen of the United States, residing at Cedar Rapids, in the county of Linn and State of Iowa, have invented a new and useful Power-Transmitting Mechanism, of which the following is a specification.

This invention relates to power transmitting mechanism designed primarily for operating machinery where minute and accurate adjustment of the drive is necessary in order to insure a predetermined result.

One use to which the invention can be put is for driving oil pumps so that the amount of oil measured by the pumps can be accurately gauged.

An object of the invention is to provide an adjustable pitman drive whereby the degree of movement of the operated element can be accurately and minutely regulated, the adjusting parts being thereafter sealed so that changes in the adjustment by unauthorized persons cannot be effected without detection.

Another object is to provide an arrangement of drive and stop clutches for controlling the rotation of the operated element.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1 is a side elevation of the mechanism constituting the present invention.

Figure 2 is an end elevation of the mechanism, the cap of the drive clutch being removed.

Figure 3 is a section on line 3—3, Figure 2.

Figure 4 is an end elevation of the driven mechanism, the cap or cover plate of the stop clutch being removed.

Figure 5 is a plan view of the adjusting screw head.

Referring to the figures by characters of reference 1 and 2 designate bearing members in which is journaled a shaft 3. The bearing member 1 is recessed in one face as indicated at 4, this recess being concentric with the shaft 3 and containing a disk 5 which is secured to the shaft 3 and fits snugly within but is adapted to rotate relative to the recess. In the periphery of this disk are formed recesses 6 each having a radial end wall 7 and a straight inner wall 8, the inner walls of the recesses being tangent to an imaginary circle concentric with the recess 4. Seated within each recess 6 is a clutch roller 9 engaged by one end of a spring 10 the other end of which is seated in the adjacent wall 7. Thus the roller is held constantly in contact with the wall of the recess 4 and with the wall 8. Consequently the disk is free to rotate in the direction indicated by the arrow in Figure 4 but rotation in the opposite direction is prevented positively by the wedging action of the rollers 9 between the wall of recess 4 and the tangential walls 8. This positive prevention of retrograde movement is essential where accurate minute transmission of motion from a reciprocating to an intermittently rotating element is desired.

A gear 11 rotates with the disk 5 and the shaft 3 and meshes, in the present instance, with a larger gear 12 journaled on the bearing 1 and projecting into a slot 13 in the bearing so as to engage the gear 11. Gear 12 can constitute part of a train of gears indicated at 14 so that an oil measuring pump or any other desired mechanism can be driven. A cap or cover plate 15 is secured to the bearing 1 so as to conceal the recess 4 and prevent the admission of foreign substances.

The shaft 3 is provided with a novel form of oscillating driving means illustrated in detail in Figures 1, 2 and 3. This includes a casing 16 mounted for rotation on the shaft and, in the present instance, provided with a removable cap 17 which normally closes a recess 18 formed within the casing and concentric with the shaft. Mounted on that portion of the shaft within the recess is a disk 19 which, if desired, can be provided with a hub 20 fastened to the shaft 3 by a set screw 21. The disk 19 has a series of recesses 22 in its periphery, one wall of each recess being radially disposed while the inner walls of the recesses are tangentially disposed to an imaginary circle concentric with the disk. Each of these recesses 22 has a clutch roller 23 loosely mounted therein and a spring 24 bears against each roller 23 and projects from the radial wall of the recess 22 in which the roller is seated. Thus the rollers will permit rotation of the casing 16 in the direction indicated by the arrow in Figure 2 but in view of the fact that the rollers are maintained in contact with the tangential walls of the recesses 22 and with the wall of the recess 18 they will operate positively to prevent any retrograde movement however minute.

Extending from the casing 16 is an arm 25 having a longitudinal slot 26 and the outer end of this arm is provided with a laterally extending ear 27 in which is swiveled an adjusting screw 28. A head 29 is provided on the swiveled end portion of the screw while a stud 30 projects from the other end of the screw and bears within a shoulder 31 formed on the casing 16.

Slidably mounted within the slot 26 is a block 32 having an enlargement or head 33 which bears against one face of the arm 25 and has the screw 28 threaded therethrough. A wrist pin 34 engages the other face of the arm 25 and has a threaded stud 35 entering the block 32. This wrist pin has a reduced bearing portion 36 for engagement by one end of a pitman 37.

Formed within the head 29 of the adjusting screw is an annular series of apertures 38 and any one of these apertures is adapted to register with an aperture 39 formed within the ear 27. Thus a seal in the form of a wire 40 or the like can be inserted through the registering apertures so that adjustment of the parts cannot be effected without breaking the seal.

It is to be understood that during the operation of the mechanism the arm 25 and the casing 16 are oscillated, the degree of movement being governed by the position of the wrist pin 34 relative to the axis of rotation of the shaft 3. The adjustment of the wrist pin radially of the shaft is effected by rotating the screw 28 and after sufficient adjustment has been effected to insure oscillation of the arm 25 through a predetermined number of degrees, the seal 40 can be inserted through the head 29 and the ear 27. The clutches carried by the shaft operate in opposition, so that when arm 25 and casing 16 are rotated in one direction the rollers 23 instantly pick up the disk 19 and the shaft 3 so as to cause said shaft to rotate the disk 5. As soon as the arm 25 is moved in the opposite direction, however, the shaft 3 will be held by the stop clutch within the bearing 1 while the casing 16 will rotate on the disk 19.

It will be obvious from the foregoing description that the mechanism herein described can be used advantageously wherever oscillating or reciprocating motion is to be converted into intermittent rotary motion, and where an accurate adjustment of the parts and positive prevention of play and of retrograde movement is essential.

What is claimed is:—

1. A power transmitting mechanism including a shaft, a friction clutch for holding the shaft against rotation in one direction, a casing rotatably mounted on the shaft, a friction clutch therein for rotating the shaft in the opposite direction, a wrist pin connected to the casing, means including a screw for adjusting the wrist pin radially, and sealing means for holding the screw against rotation.

2. A power transmitting mechanism including a shaft, a friction clutch for holding the shaft against rotation in one direction, a casing rotatably mounted on the shaft, a friction clutch therein for rotating the shaft in the opposite direction, a radial arm extending from the casing, a power receiving wrist pin carried by the arm, means for adjusting the wrist pin radially along the arm, and sealing means for holding the adjusting means against actuation.

3. A power transmitting mechanism including a shaft, a casing mounted for rotation on the shaft, a friction clutch for transmitting motion to the shaft in one direction from the casing, a friction clutch for holding the shaft against rotation in the opposite direction, a wrist pin adjustable radially relative to the casing and shaft and movable with the casing, and means for sealing the wrist pin.

4. A power transmitting mechanism including a shaft, a casing mounted for rotation on the shaft, a friction clutch for transmitting motion to the shaft in one direction from the casing, a friction clutch for holding the shaft against rotation in the opposite direction, an arm extending from casing, a wrist pin carried by the arm, screw threaded means for adjusting the wrist pin radially relative to the shaft, and seal receiving means upon said means and arm for holding the wrist pin against adjustment.

5. A power transmitting mechanism including a shaft, a casing mounted for rotation on the shaft, an arm extending from the casing, a friction clutch for transmitting motion from the casing in one direction to the shaft, a block on the arm, screw threaded means for adjusting the block longitudinally of the arm, and a wrist pin carried by the block.

6. A power transmitting mechanism including a shaft, a casing mounted for rotation on the shaft, an arm extending from the casing, a friction clutch for transmitting motion from the casing in one direction to the shaft, a block on the arm, screw threaded means for adjusting the block longitudinally of the arm, a wrist pin carried by the block, and seal receiving means for holding the wrist pin against adjustment.

In testimony that I claim the foregoing as my own, I have hereto affixed my signature in the presence of two witnesses.

JOHN J. TOKHEIM.

Witnesses:
W. McLaccua,
Orro Sikora.